United States Patent [19]

Ratermann et al.

[11] Patent Number: 5,472,276
[45] Date of Patent: Dec. 5, 1995

[54] MIXER WITH VERTICALLY MOVABLE BOWL SUPPORT AND MEANS FOR PREVENTING REMOVAL OF SAID BOWL DURING A MIXING PROCESS

[75] Inventors: Philip A. Ratermann, Tipp City; Randall L. Redman, Beavercreek, both of Ohio; Gary M. Best; Charles N. Kitchen, both of North Devon, United Kingdom

[73] Assignee: Premark FEG Corporation, Wilmington, Del.

[21] Appl. No.: 313,265

[22] PCT Filed: Oct. 15, 1993

[86] PCT No.: PCT/GB93/01534

§ 371 Date: Sep. 30, 1994

§ 102(e) Date: Sep. 30, 1994

[87] PCT Pub. No.: WO93/19606

PCT Pub. Date: Oct. 14, 1993

[30] Foreign Application Priority Data

Mar. 30, 1992 [GB] United Kingdom .................. 9206875
Jan. 7, 1993 [GB] United Kingdom .................. 9300216

[51] Int. Cl.⁶ .............................. A21C 1/02; A21C 1/14; B01F 15/00
[52] U.S. Cl. ............................................ 366/203; 366/347
[58] Field of Search .................. 366/96–98, 197–198, 366/203, 207, 288, 347, 279; 99/348

[56] References Cited

U.S. PATENT DOCUMENTS

| | | | |
|---|---|---|---|
| 1,264,128 | 4/1918 | Rataiczak et al. ................ | 366/207 |
| 1,743,271 | 1/1930 | Gould . | |
| 1,761,237 | 6/1930 | Schiff ................................ | 366/197 X |
| 2,024,282 | 12/1935 | Geiger .............................. | 366/197 |
| 5,348,393 | 9/1994 | Pappas, Jr. ........................ | 366/207 |

FOREIGN PATENT DOCUMENTS

| | | | |
|---|---|---|---|
| 876727 | 11/1942 | France . | |
| 188383 | 2/1905 | Germany . | |
| 435730 | 10/1926 | Germany . | |
| 498969 | 5/1930 | Germany ......................... | 366/97 |
| 2422560 | 11/1975 | Germany . | |
| 9001012 | 6/1990 | Germany . | |
| 59145 | 5/1912 | Switzerland .................... | 366/97 |
| 1063356 | 12/1983 | U.S.S.R. .......................... | 366/97 |
| 325777 | 2/1930 | United Kingdom ............ | 366/197 |
| 703104 | 1/1954 | United Kingdom . | |
| 903592 | 8/1962 | United Kingdom . | |

Primary Examiner—David Scherbel
Assistant Examiner—Charles E. Cooley
Attorney, Agent, or Firm—Thompson Hine and Flory

[57] ABSTRACT

A food mixer comprises a base, a supporting structure or column upstanding from the base and an arm projecting from the upper end of the column and carrying a mounting member for a mixing tool. The column is provided with a vertically extending V-section channel on its bowl-facing side which, in use, receives part of the periphery of the mixing bowl so that the necessary horizontal extensions of the head from the column is minimized. The mixing bowl is supported on a mixing bowl support vertically movable on the column to bring the bowl up to the mixing tool and lower the bowl therefrom. Except in the fully lowered position of the bowl support, the bowl is held captive on the bowl support by a pin which is extended upwardly through a hole in a flange of the bowl, the flange being received in a slot in the bowl carrier. The pin is carried by a lifting mechanism for the bowl support and is arranged with a degree of vertical lost motion relative to the bowl support, thus ensuring that the bowl is automatically locked into the bowl support before any lifting movement takes place and is not released until the bowl support has been fully lowered.

5 Claims, 11 Drawing Sheets

MIXER WITH VERTICALLY MOVABLE BOWL SUPPORT AND MEANS FOR PREVENTING REMOVAL OF SAID BOWL DURING A MIXING PROCESS

BACKGROUND OF THE INVENTION

This invention relates to mixing machines, in particular to food mixers, of the kind having a mixing bowl, a bowl support and a mixing tool engageable with the contents of a mixing bowl supported by said bowl support.

Typically, food mixers of this kind comprise a base, a supporting structure upstanding from the base, mounting means at the upper end of the supporting structure movably supporting a mixer tool extending downwardly from the mounting means whereby the mixer tool can extend downwardly from the mounting means into a bowl of flowable product positioned, on the bowl support, adjacent the supporting structure, the mixer including driving means for said mixer tool adapted to produce a mixing movement of such a mixer tool in a bowl of flowable product so positioned. Such a mixer is herein referred to as being "of the kind specified".

In known mixers of the above type, the supporting structure upstanding from the base takes the form of a more or less rectangular vertical column from the upper end of which projects generally horizontally an arm which carries a drive system coupled with a mixer tool, for example in the form of a whisk, which extends vertically downwardly from the arm and is arranged for example simply to rotate about a vertical axis or to make an epicyclic rotational movement about a combination of vertical axes relative to said arm whereby the lower end of the mixing tool, extended into product within a bowl supported adjacent the column beneath the arm, can be made to mix the product in the bowl. Because of the need for the arm to project sufficiently far horizontally from the vertical column to be capable of being aligned substantially with the middle of the bowl below and because the engagement of the bowl rim with the vertical column defines the minimum horizontal distance from the middle of the bowl to said column, the horizontal arm must be relatively long in these known arrangements and consequently the arm and the vertical column must be made fairly heavy and robust in construction to avoid excessive flexure under the dynamic and static forces exerted by the stirring movements of the mixing tool and the weight of the drive system.

SUMMARY OF THE INVENTION

It is an object of the present invention to provide an improved food mixer having a relatively compact structure which can be made stiff enough to resist undue flexure in response to the forces arising during mixing.

According to one aspect of the invention there is provided a mixer comprising a base, a supporting structure upstanding from the base, mounting means at the upper end of said supporting structure movably supporting a mixer tool extending downwardly from said mounting means, the mixer including driving means for said mixer tool, whereby said mixer tool can extend downwardly from said mounting means into a bowl of a flowable food product and can be driven, by said driving means, to execute a mixing movement, in said product relative to said bowl, and wherein said supporting structure is provided with a recess which, in use, faces towards the zone of action of said mixing tool, said recess being adapted to receive part of the periphery of such a bowl positioned for mixing of the food product therein by said mixing tool.

In mixers of the kind specified, the bowl support, in addition to supporting the bowl at the required level during mixing, and lifting the bowl up into cooperation with the mixing tool and lowering it away from the mixing tool, is required to restrain the bowl from rotation with the mixing tool, or dislodgement, such as might occur otherwise where a particularly stiff product is being mixed, or the bowl, with a particularly adherent mix therein, is being lowered from the bowl's working position. Furthermore, for safety reasons, it is desirable to ensure that the bowl cannot be removed from the machine by personnel when the bowl is in the raised or operating position.

It is another object of the invention to provide means whereby a mixing bowl can be reliably located and retained on a bowl support of such a machine at times when the contents of the bowl are likely to be engaged by the mixing tool, whilst ensuring that the bowl can be readily loaded onto or unloaded from the mixing machine at the beginning and end respectively of a mixing operation.

According to another aspect of the invention, therefore, there is provided a mixing machine having a mixing bowl, a bowl support, a generally horizontal flange or lug extending from the periphery of said mixing bowl for engagement in a horizontally extending slot or recess in said bowl support, said flange or lug having a hole extending vertically therethrough, said bowl support carrying a pin which is mounted for vertical movement relative to the bowl support in the region of said slot or recess, the arrangement being such that in the installed position of the mixing bowl relative to said bowl support, said flange or lug extends into said slot or recess and said hole is in vertical alignment with said pin, said pin being movable vertically relative to the bowl support so that it can move between a position in which it is withdrawn from said slot or recess and a position in which it extends into said slot or recess and through said hole in said lug or flange when the bowl is in said installed position on the bowl support, thereby to prevent removal of the bowl from the bowl support.

BRIEF DESCRIPTION OF THE DRAWINGS

Embodiments of the invention are described below by way of example with reference to the accompanying drawings wherein.

DETAILED DESCRIPTION

Referring to FIGS. 1 to 11, the food mixer shown comprises a base formed by two spaced apart front legs 10 and two spaced apart rear legs 12, each front leg 10 and a corresponding rear leg 10 being interconnected by a respective horizontal beam 14 integral with the legs. A vertically extending support structure 16 rests on and is secured to the beams 14, the beams 14 being disposed at respective sides of the structure 16. The support structure 16 comprises elements 15, 17 and 19 (see below). An arm 18 projects horizontally from the upper end of the structure 16, over the space between the beams 14 and the front legs 10. An arcuate bowl support 20 carried by the structure 16 defines a part-circular recess which is substantially centered on the main vertical axis of the mixing means supported by the arm 18.

The lower portion of the structure 16 has the general form of a rectangular block with a substantial V-section channel 24 extending vertically up its front, whereby the front to back dimension of the support structure 16 is substantially less midway between the sides of the structure 16 than at said sides. This is best shown in the horizontal sectional view of FIG. 4. This V-section channel 24 can accommodate a substantial part of the periphery of the mixer bowl, in use, whereby the extent to which the arm 18 needs to project forwardly relative to the lateral portions of the support 16 is minimised, making for a particularly rigid and compact structure.

Figure 1:
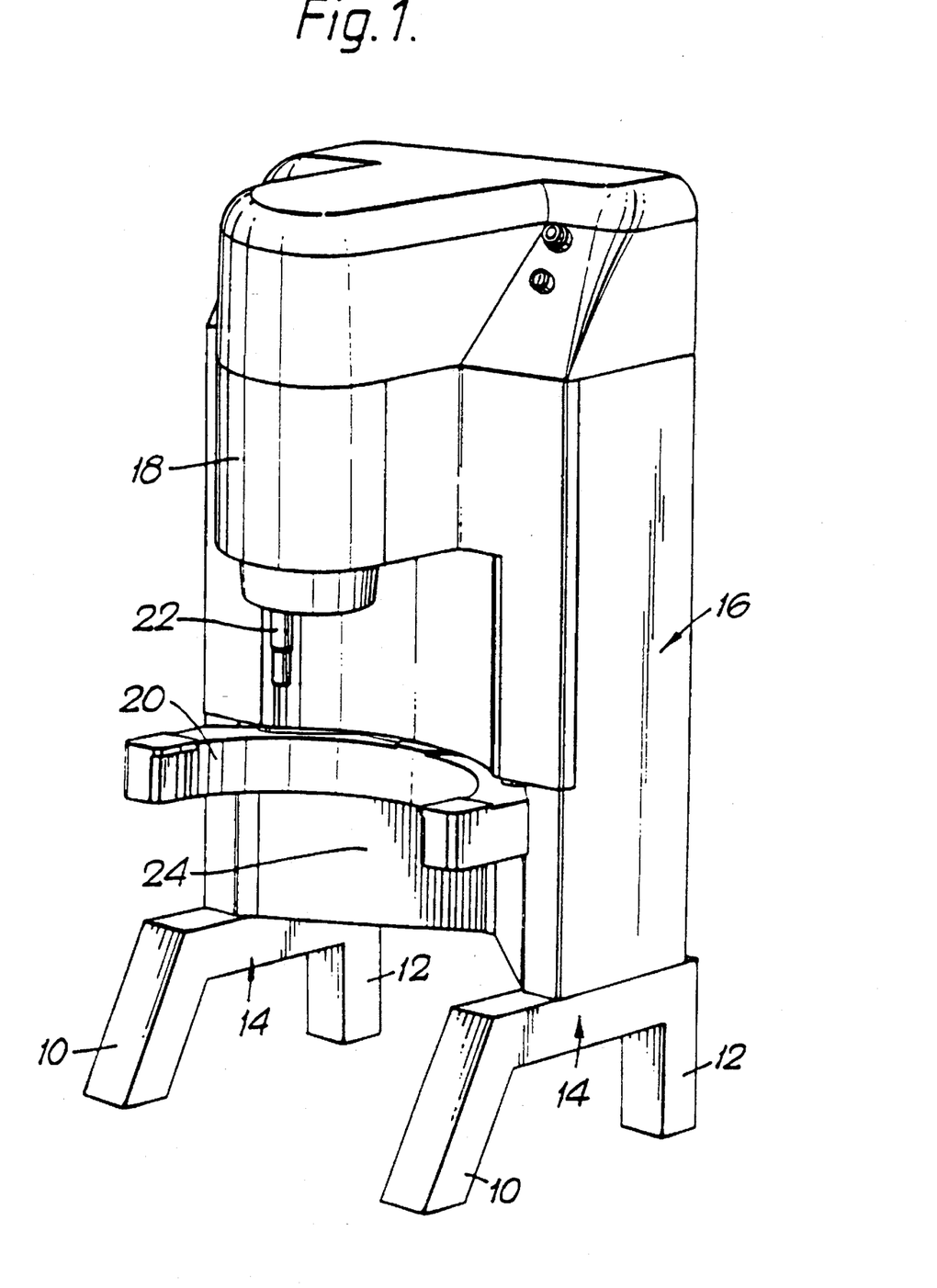
FIG. 1 is a perspective view of a food mixer embodying the invention.
Figure 2:
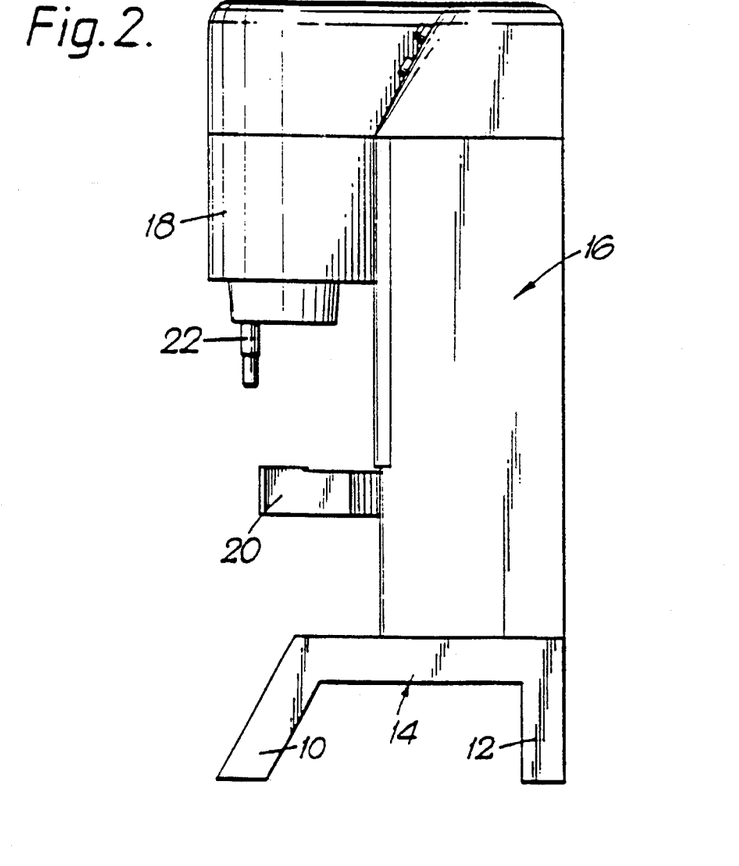
FIG. 2 is a view of the mixer of FIG. 1.
Figure 3:
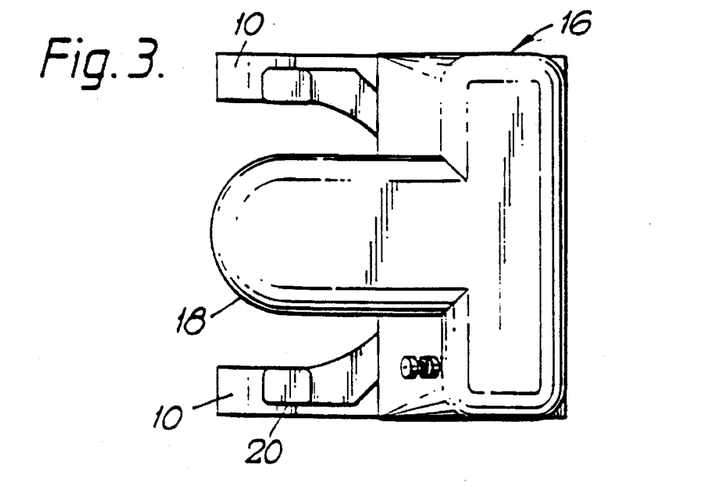
FIG. 3 is a plan view of the mixer.
Figure 4:
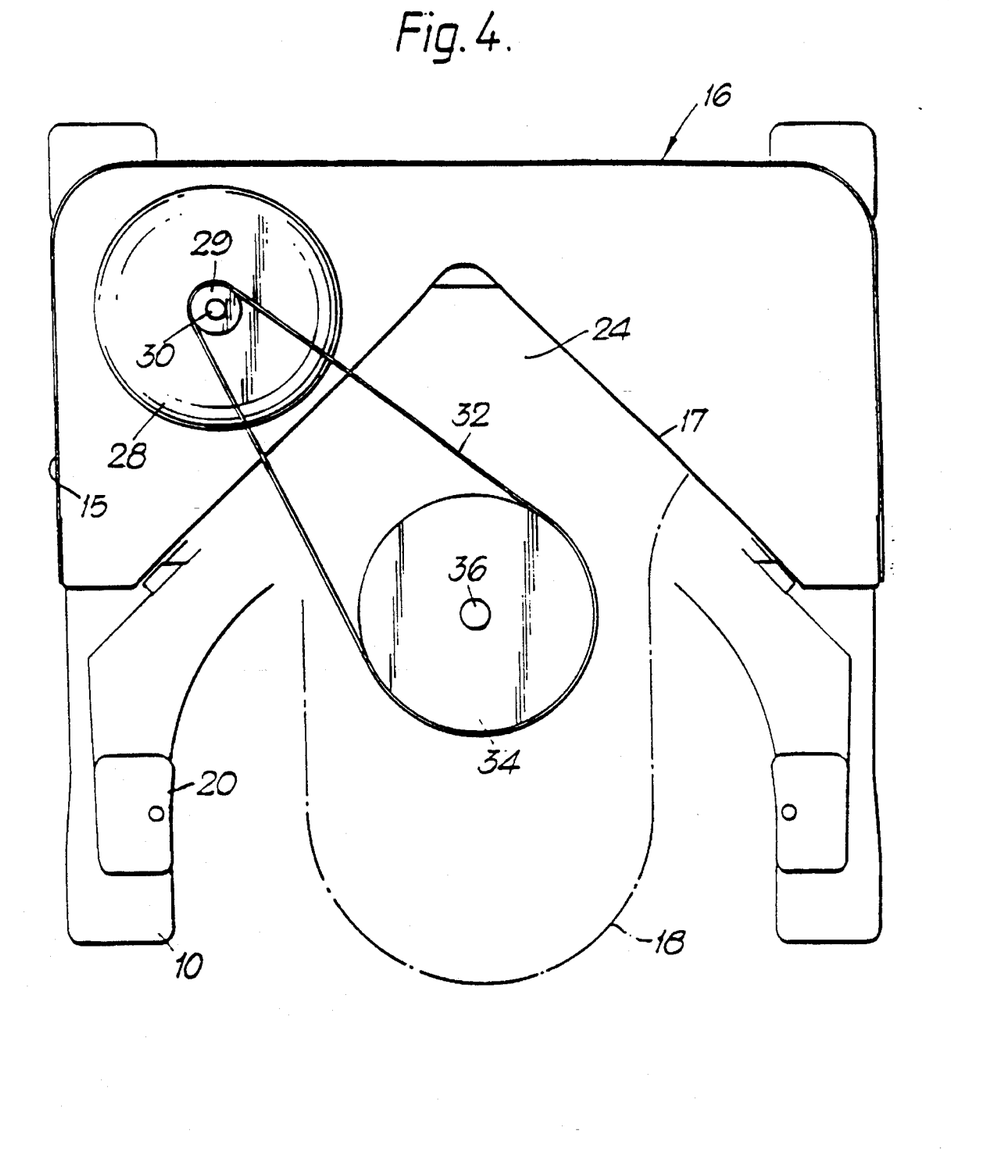
FIG. 4 is a schematic horizontal sectional view of the mixer.

The support structure 16 comprises a framework or body comprising a member 17 of relatively thick gauge sheet metal which defines the channel 24 and which member is indicated in heavy solid lines in FIG. 4, to which member are welded horizontal plates or baffles 19, at top, bottom and intermediate levels, (see FIG. 9), the beams 14 bearing the legs 10, 12 being secured to the lowermost baffle 19. The sides and rear of the structure are covered by a light-gauge cover member 15 of sheet metal providing the vertical side walls and the rear wall of the structure 16.

The bowl support 20 is adapted to support a complementary bowl (not shown) containing substances to be mixed, at a level clear of the surface on which the feet 10, 12 rest. The bowl holder 20 is mounted for vertical sliding movement relative to the support structure 16, so that a bowl supported by the bowl holder 20 can be raised or lowered relative to the head 18 and mixing shaft 22. Such vertical movement is effected through the agency of a bowl lifting rod 66, (FIGS. 10 and 11), mounted for longitudinal movement in the support structure 16 and movable manually via a lever mechanism (not shown) or power-movable, e.g. by means of an auxiliary electric motor. For ease of illustration, the support structure is not shown in FIGS. 10 and 11 and only part of the bowl lifting rod is shown. The mixing bowl 61, shown only partially in FIGS. 10 and 11, has three horizontal lugs or flanges projecting from its periphery, which flanges rest upon upwardly facing surfaces of the bowl support 20. Two of these flanges rest on the free ends of respective limbs of the bowl support 20 whilst the third flange, referenced 67, at the rear of the mixing bowl, has an aperture 68 extending vertically therethrough.

Figure 10:
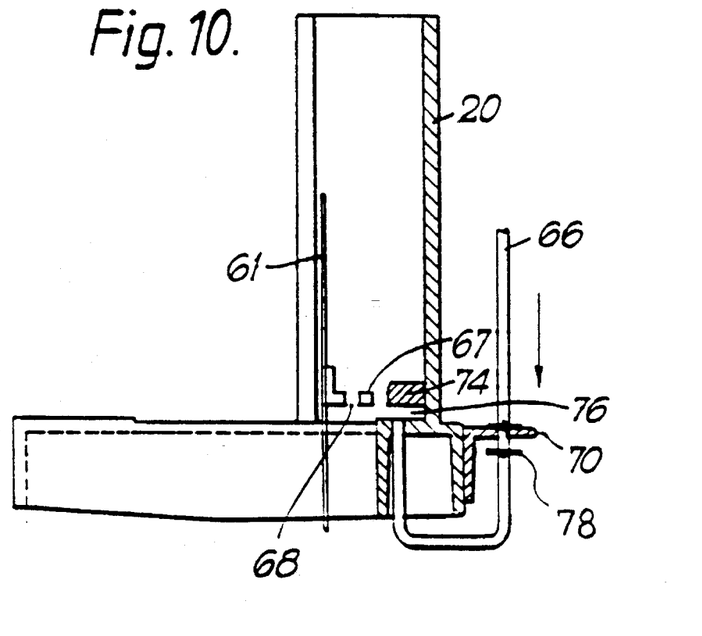
FIGS. 10 and 11 are fragmentary side views, in section, showing part of the mixer.
Figure 11:
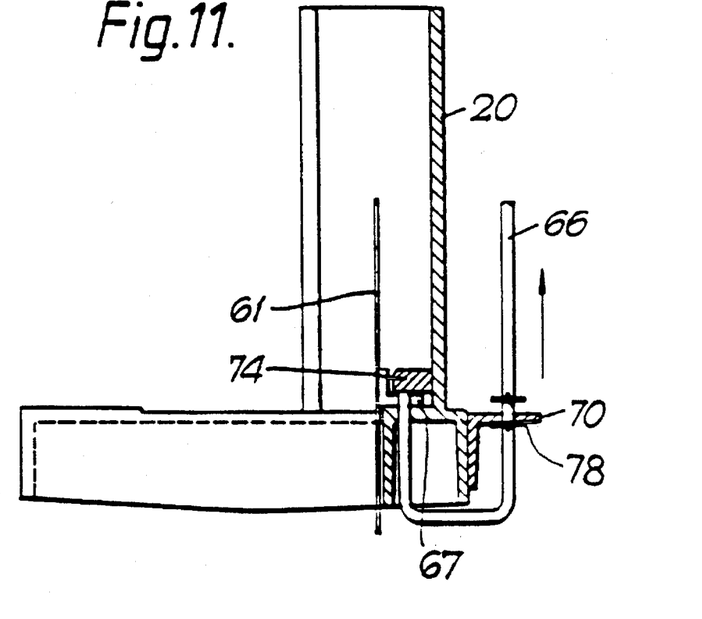

The bowl lifting rod 66 is generally J-shaped at its lower end, the longer limb of the J extending upwardly to the lever mechanism referred to, or to the equivalent power-operated mechanism. The longer limb of the J-shaped rod 66 extends downwardly through an aperture in a horizontal flange 70 provided at the rear of the bowl support, the horizontal limb of the J extending with clearance below the rear portion of the bowl support and the shorter arm of the J extending upwardly through an aperture in the part of the bowl support which, in use, supports the flange 67 at the rear of the bowl.

The bowl support 20 has, fixed thereto, a bowl stop 74 which extends over the bowl-flange-supporting surface of the bowl holder 20, above the free end of the rod 66, with sufficient clearance with respect to said bowl-flange-supporting surface to define therewith a slot 76 adapted to receive snugly the flange 67 on the bowl when the latter is in place on the bowl support.

In the lowermost position of the bowl lift rod, as shown in FIG. 10, the bowl support is supported by an abutment (not shown), fixed with respect to the structure 16 of the mixer and the upper end of the shorter arm of the J-shaped rod 66 is flush with, or somewhat below, the bowl-support-ing-supporting surface of the bowl support, leaving the slot 76 unobstructed. Thus the bowl can be mounted on the bowl support with its rear lug 67 extending into the slot. The bowl lift rod can then be raised by the manually or power-operated lever mechanism referred to, thereby initially extending the free end of the shorter arm of the J-shaped rod 66 into the slot 76 through the aperture 68 in the rear lug 67 of the bowl to engage the bowl stop 74 as illustrated in FIG. 11. As the bowl lift rod continues to be lifted, an abutment 78 on the longer arm of the "J" pushes against the underside of flange 70 and thereby moves the bowl support 20, with the bowl supported thereby, upwardly, moving the bowl into its raised position. Thus it is ensured that away from the loading position of the bowl, the bowl is restrained against dislodgement from the bowl holder 20, such as might occur otherwise where a particularly stiff product is being mixed, or the bowl, with a particularly adherent mix therein is being lowered from the bowl's working position. (In the latter case there is a tendency for the mix to cause the bowl to adhere to the mixing tool so pulling it off the bowl holder 20). The bowl is further restrained against rotation about a vertical axis, (such as might occur otherwise where a particularly stiff product is to be mixed, as a result of the torque exerted, through the product to be mixed, by the mixing tool on the bowl), by bowl pins set at the ends of the bowl holder limbs and which engage in holes in the bowl lugs or flanges which rest on the ends of said limbs.

The arm 18 houses bearings and appropriate reduction system and transmission means whereby an electric motor housed in the structure 16 can drive a mixer shaft 22 adapted to receive a mixing tool (not shown). The drive system in question may include epicyclic or planetary gearing whereby the shaft 22, in use, rotates about its own axis and, at the same time, revolves around a main vertical axis of the arm 18 displaced laterally from the rotational axis of the shaft 22, so that the mixing tool is made to execute an epicyclic or planetary mixing movement. A mixer in which the food mixing tool executes this type of movement is referred to as a planetary mixer. It will be appreciated that the constructional principles described herein with reference to the drawings are equally applicable to a mixer in which the mixing tool, in use, simply rotates about an axis which is fixed with respect to the supporting structure 16, and to arrangements in which other motions are executed by the tool, e.g. to a whipper or whipper mixer.

As shown in FIG. 4, the electric driving motor (referenced 28) which is illustrated as having the overall form of a vertically extending cylinder (a shape to which many electric motors approximate closely in practice) is accommodated within one of the two lobes, of generally triangular horizontal section, defined by the structure 16 on either side of the median plane of the V-section channel 24. A pulley 29 at the upper end of the output shaft 30 of motor 28 is connected by an endless driving belt 32 with a further pulley 34 mounted on the input shaft 36 of the gearing which drives the mixer shaft 22. Since the arm 18 does not have to support the driving motor of the mixer, as the arm has to do in conventional mixers, the arm 18 can be relatively compact.

Figure 5:
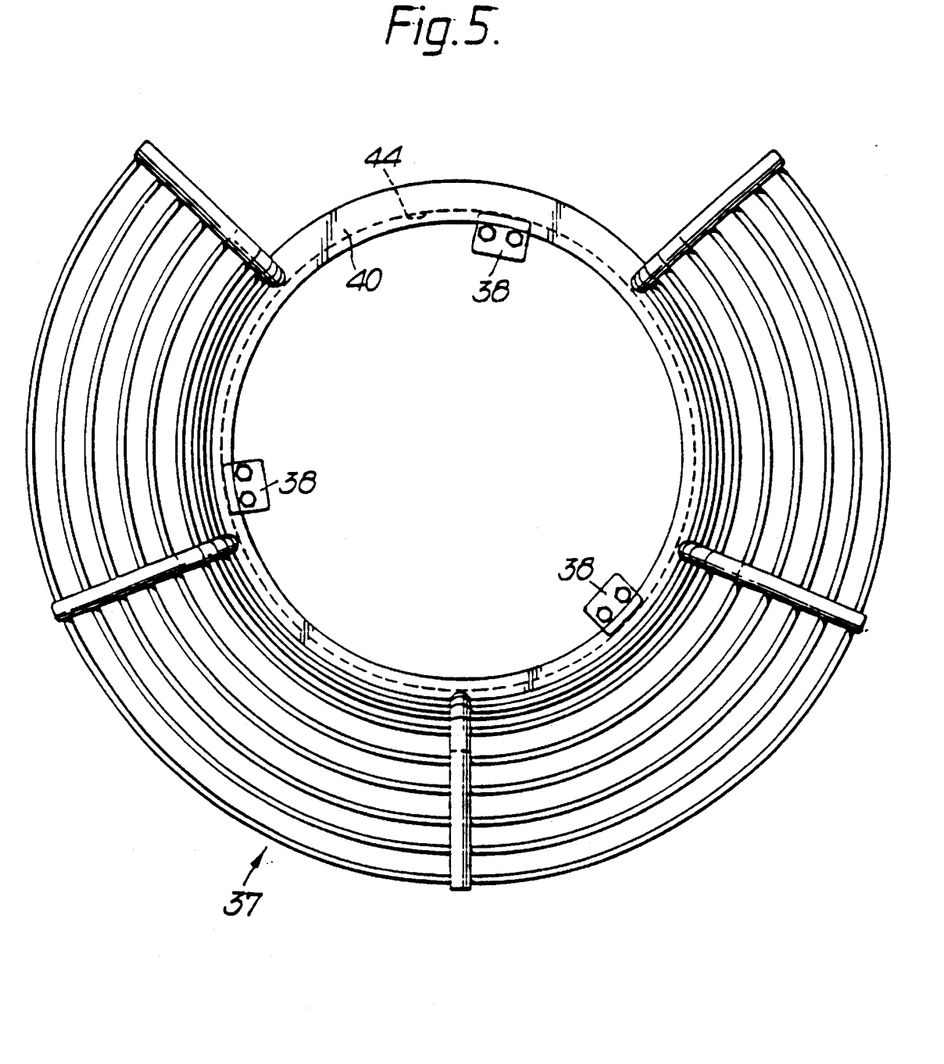
FIG. 5 is a plan view of a detachable guard.
Figure 6:
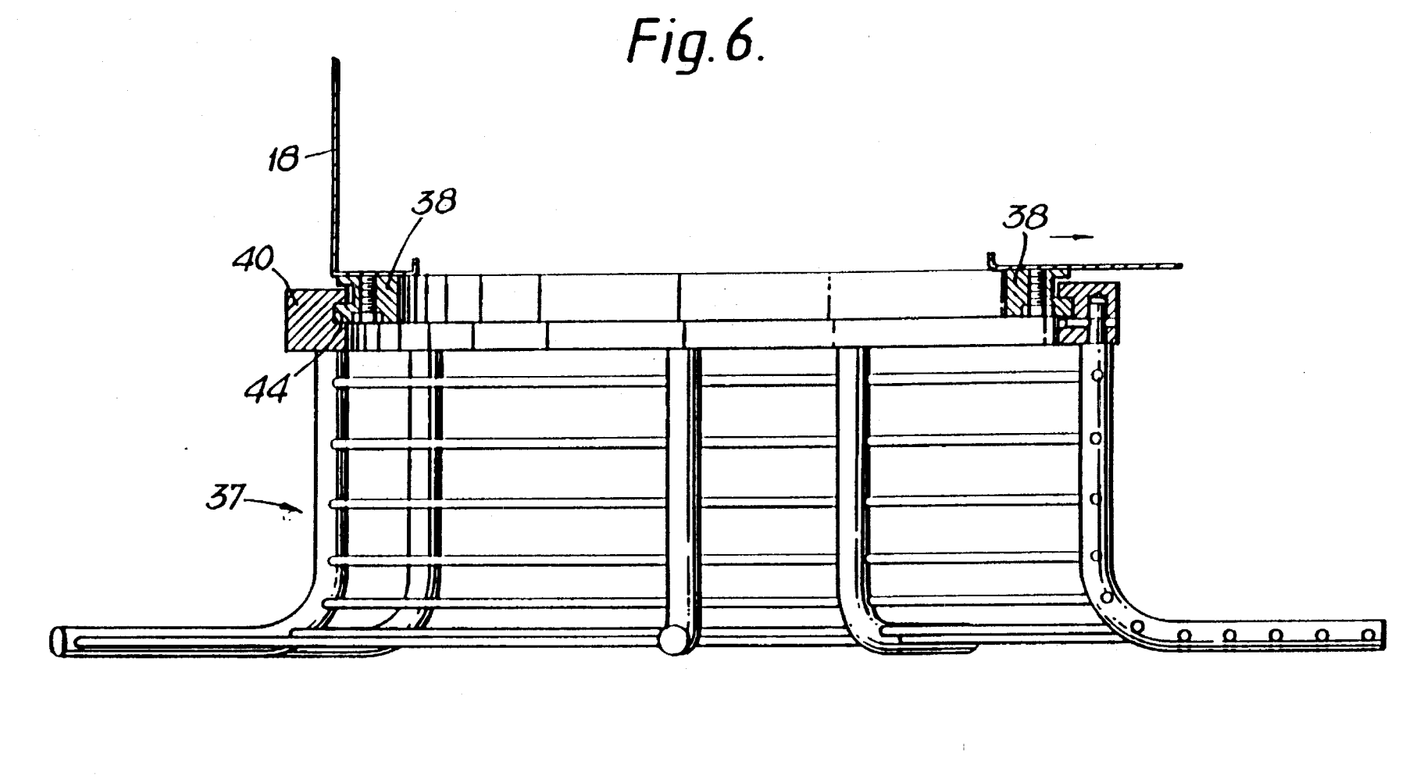
FIG. 6 is a vertical sectional view of the guard fitted to the food mixer of FIGS. 1 to 4.

FIGS. 5 and 6 illustrate a safety guard 37 which may be detachably fitted to the mixer of FIGS. 1 to 4. In FIG. 6, the lower portion of the arm 18 is indicated vestigially, the shaft 22 and associated driving mechanism being omitted for the sake of clarity. The guard 37 is secured to the underside of the arm 18 by means of retaining elements or bearings 38 mounted on the underside of the arm 18 and engaging in a collar 40 which forms the upper part of the guard. The guard 37 comprises an openwork frame of fabricated metal wire construction forming a skirt extending downwardly from the collar 40. As shown in FIG. 6, the skirt includes an upper generally cylindrical portion merging at its lower end with a generally horizontal outwardly directed flange. As shown in FIG. 5, the skirt is omitted over approximately a 90° sector with respect to the centre of the collar. As illustrated in FIG. 6, the collar has, on its radially inner side, a circumferential groove 44 which, when the skirt is mounted, receives outwardly directed lugs or flanges of the bearing members 38.

The guard 37 is rotatable, on the bearings 38, about the vertical axis of the mixer, allowing the guard 37 to be rotated between a position in which the sector over which the skirt is omitted is disposed to the front of the machine, allowing access by operatives to the mixer tool, and a position in which the open sector of the guard is disposed adjacent the structure 16, thereby presenting the skirt portion of the guard to the exterior.

Figure 7:
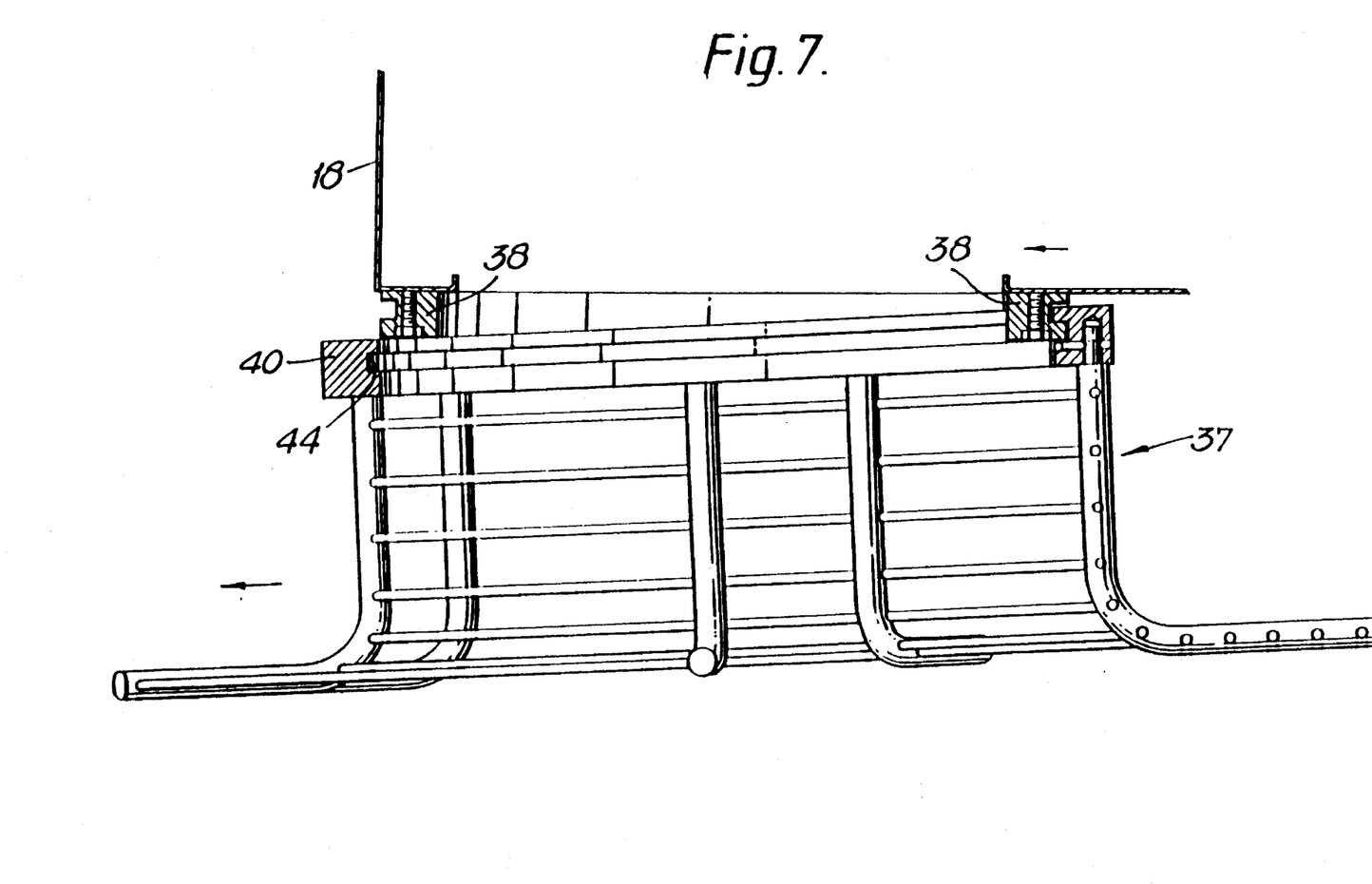
FIG. 7 is a view similar to FIG. 5 but showing how the guard is detached and fitted.

As indicated in FIG. 5, the bearing members 38 are located at substantially 120° intervals around the vertical axis of the mixer, with two fixed bearings 38 being secured to the underside of the arm at positions forward of the mixer axis and a single, sprung bearing 38 being located rearwardly of the mixer axis so as to engage the collar substantially in the middle of the portion over which the skirt is omitted. The rearward bearing 38 is movable in a fore and aft direction and is spring biased rearwardly, in the direction of the arrow in FIG. 6. Accordingly, when the guard is fitted, the resiliently biased rearward bearing 38 pulls the collar 40 rearwardly to ensure full engagement of the forwardmost bearings 38 in the peripheral channel 44. Removal of the guard, when necessary, can be effected simply by pulling the guard forwardly, as illustrated in FIG. 7, to move the rearward bearing 38 forwardly against its spring bias and disengage the front portion of the collar 40 from the forward bearings 38, and by thereafter lowering the front part of the collar to clear the front bearings 38, moving the guard bodily rearwardly to disengage the rearward bearing 38 from the collar 40 and withdrawing the whole guard downwardly (the bowl having, of course, been removed).

Figure 8:
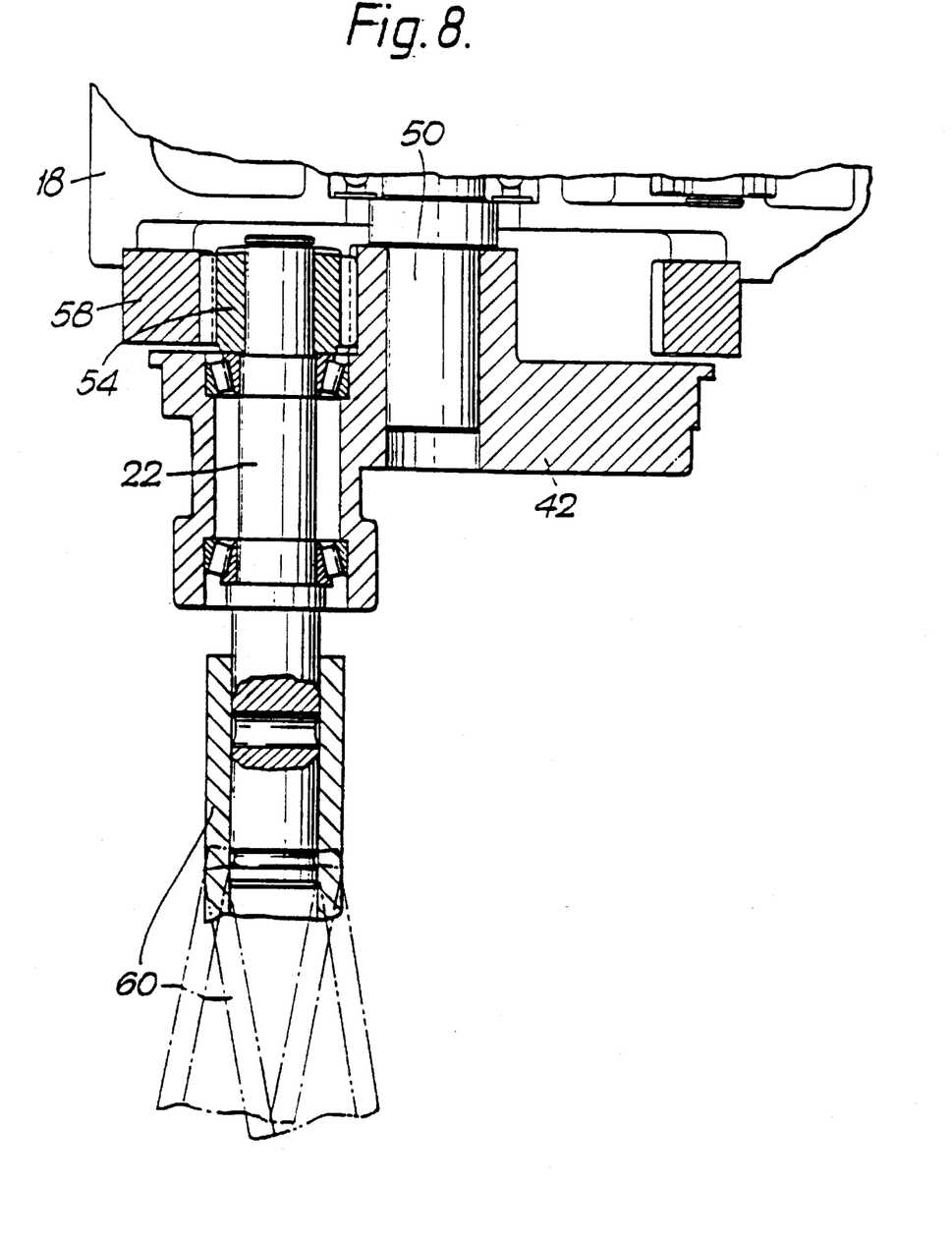
FIG. 8 is a partial vertical section view showing the mounting of a whipping tool on the shaft of the mixer.
Figure 9:
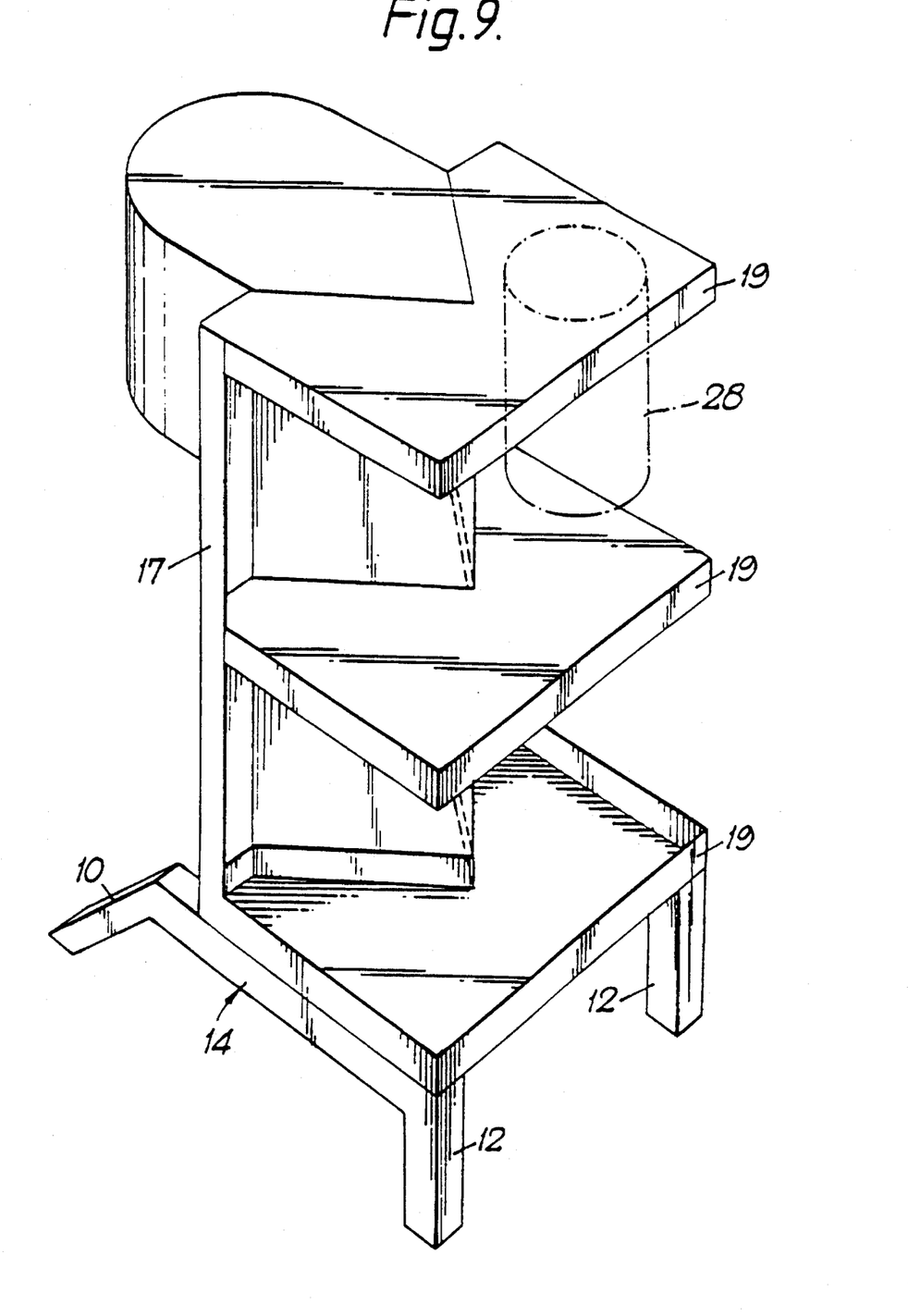
FIG. 9 is a diagrammatic rear perspective view of the mixer, with part removed for purposes of illustration.

FIG. 8 is a schematic vertical section view illustrating one form of planetary or epicyclic gearing which may be used for the mixer. In the arrangement shown in FIG. 8, a central vertically extending driven shaft 50 projecting downwardly from the arm 18 has secured thereto a wheel 42 in which is mounted, for rotation about a vertical axis parallel with that of the shaft 50 but displaced transversely therefrom, the mixer shaft 22. A gear 54 secured to the upper end of the mixer shaft 22 meshes with an internally toothed ring gear 58 secured to the arm 18 and concentric with the shaft 50. Thus, as the shaft 50 is rotated, the shaft 22 is caused to rotate about the axis of the shaft 22.

The whisk or other mixer tool is detachably secured to the drive shaft 22 by means of a bayonet-type connection (not shown), the mixer tool having a tubular upper portion which fits closely around the drive shaft. It will be appreciated that, in view of the close tolerance fit of the tool with the drive shaft, if the drive shaft and the inner bore of the tubular upper portion of the mixer tool were quite plain, there could be substantial difficulty in fitting the mixer tool to the shaft for such fitting would not be possible until nearly exact alignment had been achieved between the shaft and the bore in the mixer tool, and it can be difficult for an operative to achieve such alignment by hand, in normal operating conditions. This difficulty is in fact present in many known forms of mixer.

In order to minimise difficulty in fitting the tool to the drive shaft, in the preferred embodiment, the lower end of the shaft 22 is provided with a "ball end", i.e. has its peripheral surface so formed as to be convex in axial section through the shaft 22 over a portion immediately adjacent the free end, merging with a shallow groove, concave in axial section through the shaft, immediately above said end portion. This form of the shaft end allows the tubular upper part of the mixer tool to be slipped over the "ball end" even with a measure of axial and angular misalignment between the tool and the shaft. The tool can then be brought into alignment with the shaft by a camming action between the engaging surfaces (assisted if necessary by a slight manually imparted "rocking" action) as the tool is pushed upwards so that the tool slips upwardly onto the shaft as intended. Rotational motion is transmitted to the tool from the shaft via the bayonet connection.

Figure 12:
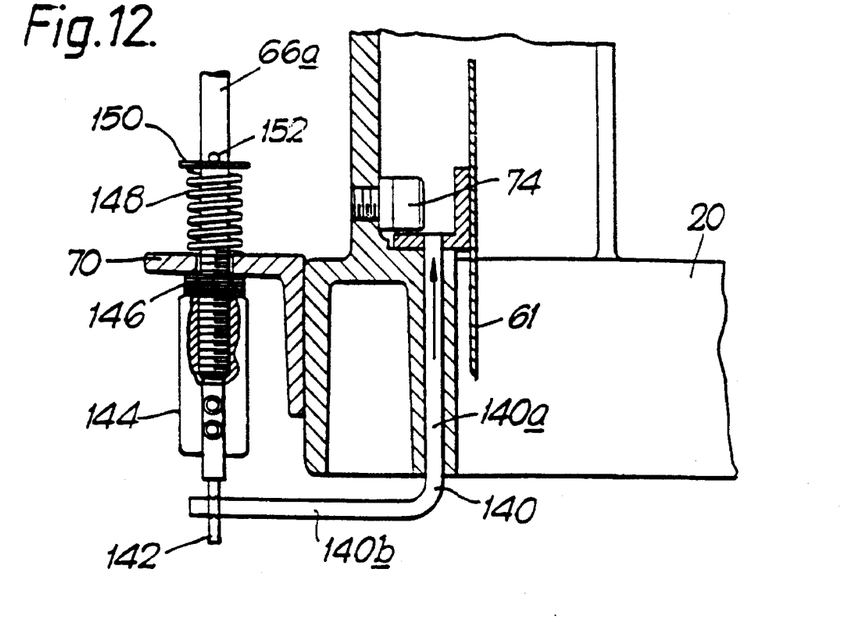
FIGS. 12 and 13 are corresponding fragmentary side views showing a variant.
Figure 13:
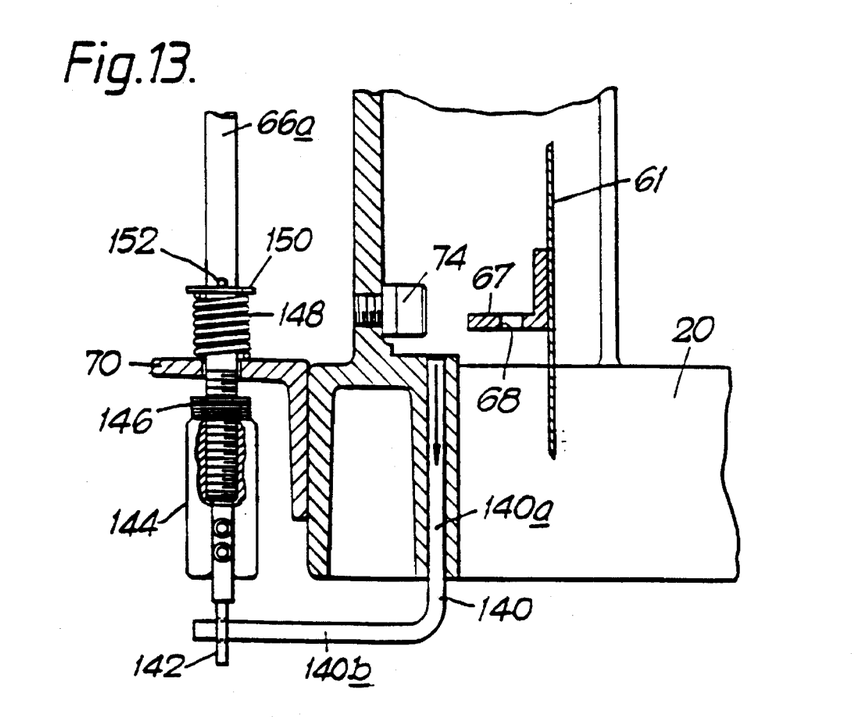
Figure 14:
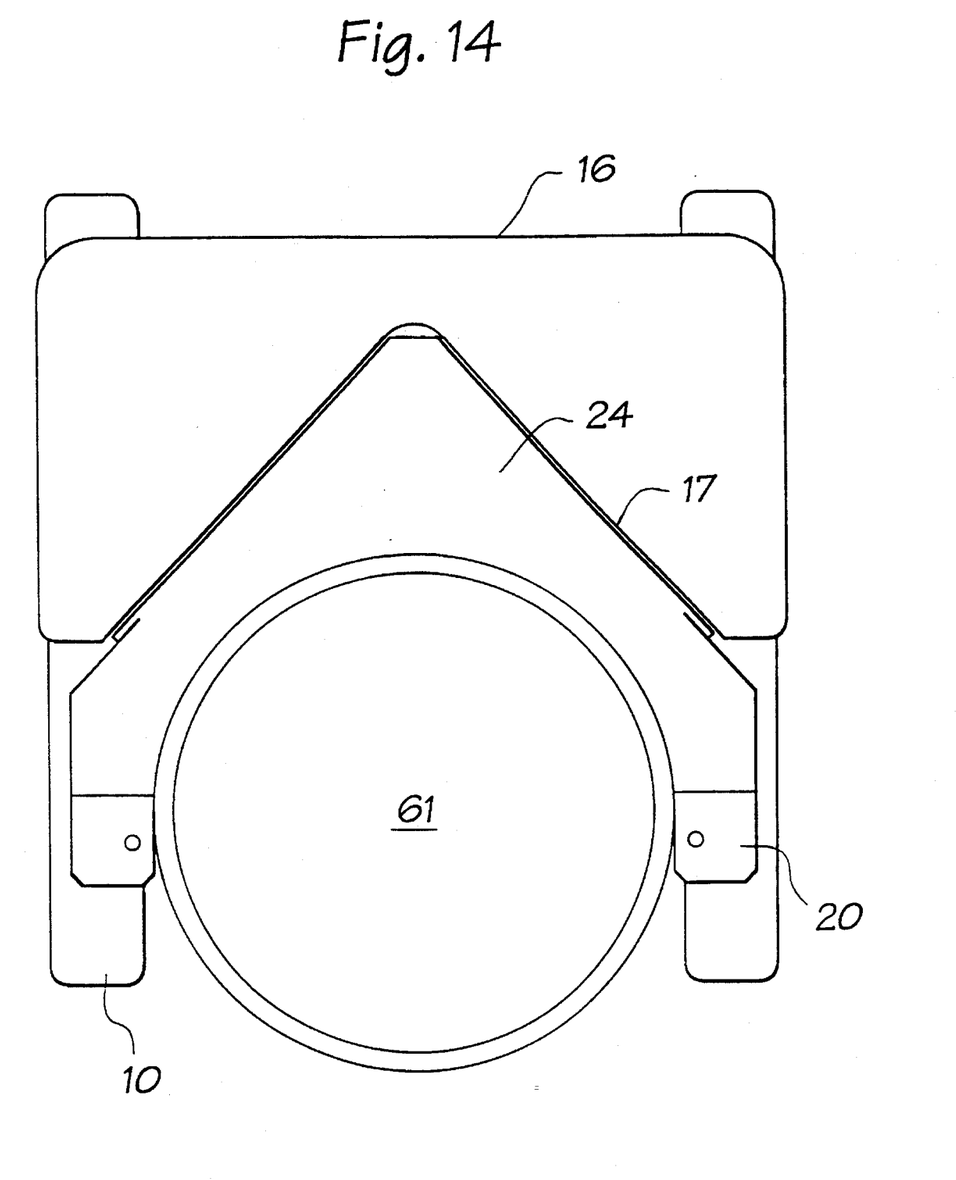
FIG. 14 is a sectional view showing the bowl seated in the V-shaped recess of the mixer.

Referring to FIGS. 12 and 13 in which like references to those used in FIGS. 10 and 11 are used for like parts, the J-shaped 66 rod is replaced by the combination of a straight vertically extending lifting rod 66a and an interlock pin 140 (which effectively replaces the shorter vertical arm and the horizontal connecting limb of the rod 66 in FIGS. 10 and 11. The interlock pin 140 thus comprises a vertically extending part 140a and, extending from the lower end of part 140a, a horizontal part 140b which extends through an aperture provided in a plate 142 which is carried by an adjusting nut 144 which is screw threadedly engaged on a screw threaded lower end portion of the rod 66a. The nut 144 is disposed below the horizontal flange 70 and a stack of annular disc springs 146 is fitted loosely around the rod 66a directly above the nut 144 and below the flange 70. A compression spring 148 extends loosely around the rod 66a directly above the flange 70 and engages, at its upper end, a washer 150, upward movement of which is limited by a transversely extending abutment pin 152 passing through the rod 66a. The arrangement is such that the spring 148 is normally held somewhat compressed between the flange 70 and the washer 150 and thus urges the rod 66a upwardly and the flange 70 downwardly. Except when the rod 66a is in its lowermost position, the flange 70, thus urged downwardly relative to the rod 66a, together with the bowl carrier 20, is clamped between the lower end of the spring 148 and the upper end of the stack of disc springs 146. (See FIG. 12).

However, towards the lower end of the downward stroke of the rod 66a, after the bowl carrier 20 has engaged the abutment referred to, continued downward movement of the rod 66a results in corresponding downward movement of the interlock pin 140, whereby the free upper end of the latter is withdrawn downwards from the aperture 68 in the flange 67 extending from the bowl 61, allowing removal of the bowl as in the embodiment described with reference to FIGS. 10 and 11. This position is shown in FIG. 13. In intermediate or raised positions of the rod 66a and bowl, as shown in FIG. 12, the upper end of the vertical portion 140a of the interlock pin 140 projects into the aperture 68 in the flange 67, thereby preventing withdrawal of the bowl.

The vertical position of the interlock pin 140 relative to the rod 66a is adjustable by turning the nut 144 on the rod 66a. The plate 142 is carried by a pin which extends axially into the lower end of the nut 144 and is rotatable with respect to the nut but is held against vertical movement relative to the nut 144. Alternatively, the last-mentioned pin may be releasably clamped to the nut by means of clamping screws.

What is claimed is:

1. A food mixer comprising:

a base, a supporting structure upstanding from the base, the supporting structure having an upper portion, mounting means at the upper portion of said supporting structure, said mounting means being capable of movably supporting a mixing tool which extends downwardly from said mounting means when said mixing tool is supported on said mounting means, a drive system for driving said mounting means, whereby said mixing tool can extend downwardly from said mounting means into a bowl of a flowable food product and can be driven, by said drive system to execute a mixing movement in said food product relative to said bowl, and wherein said supporting structure is provided with a substantially V-shaped recess which faces towards said mounting means, said recess being adapted to receive part of a periphery of a bowl so that a bowl would be positioned for mixing of the food product therein by said mixing tool.

2. A mixing machine comprising:

a mixing bowl having a periphery;

a bowl support having a horizontally extending slot;

a generally horizontal flange extending from said periphery of said mixing bowl for engagement in said slot in said bowl support, said flange having a hole extending vertically therethrough; and a pin mounted in said bowl support for vertical movement relative to the bowl support such that when said mixing bowl is positioned in said bowl support, said flange extends into said slot and said hole is in vertical alignment with said pin and such that the pin can move between a first position wherein said pin is withdrawn from said slot and a second position wherein said pin extends into said slot and through said hole in said flange when the bowl is engaged in said bowl support, thereby preventing removal of said bowl from said bowl support.

3. A mixing machine according to claim 2 further comprising:

a support frame;

a lifting member coupled with said bowl support and said pin;

wherein said bowl support is mounted on said support frame for vertical movement relative to said support frame by said lifting member for raising of said bowl support into a first position in cooperation with a mixing tool and for lowering said bowl support into a second, retracted position away from said mixing tool, said lifting member being coupled with said bowl support such that limited lost motion is permitted, said pin being coupled with said lifting member so as to move therewith, so that said pin extends into said slot and through said hole in said flange when said lifting member is raised and said pin is only retracted from said hole and said slot when the bowl support is completely lowered.

4. A mixing machine according to claim 3 wherein said lifting member is in the form of a vertical rod passing through an aperture in a part of said bowl support and carrying, below said part of said bowl support, an abutment member for engagement with an underside of said part for lifting the bowl support.

5. A mixing machine according to claim 4 wherein said vertical rod carries, above said part of the bowl support, a compression spring acting between said part and an abutment on said rod, said spring serving to keep said part in engagement with said abutment member until, during lowering of the bowl support, the abutment member arrests the lowering movement of the bowl support.

* * * * *